Sept. 24, 1974  R. L. McCONNELL ET AL  3,837,990
REINFORCED CUSHIONING MATERIAL
Original Filed June 19, 1970

RICHARD L. McCONNELL
JAMES E. HUFFAKER
INVENTORS

BY

ATTORNEYS

United States Patent Office 3,837,990
Patented Sept. 24, 1974

3,837,990
REINFORCED CUSHIONING MATERIAL
Richard L. McConnell, 421 Manderley Road 37660, and James E. Huffaker, 1117 Radcliffe Drive 37664, both of Kingsport, Tenn.
Continuation of abandoned application Ser. No. 47,851, June 19, 1970. This application Dec. 7, 1972, Ser. No. 313,005
Int. Cl. B32b 3/12
U.S. Cl. 161—68
6 Claims

ABSTRACT OF THE DISCLOSURE

Molded thermoplastic sheet material useful in cushioning applications. The material is provided with a multiplicity of adjacent, closely spaced cellular protrusions extending from one side of the sheet material and an interconnected grid of land areas at the base of the cells. The cushioning material is reinforced with pervious material attached to and connecting the land areas so as to resist deformation.

---

This is a continuation of application Ser. No. 47,851, filed June 19, 1970, now abandoned.

This invention is directed to a crush resistant, shock absorbent material. More particularly, this invention is directed to a shock absorbent material formed basically of a thermoplastic material and having superior qualities of shock absorbency, rigidity, ability to regain shape and economy.

The art of packaging has advanced from the mere concept of placing the article to be shipped in a container and stuffing a bulky, crushable material around it until it was believed that shipment could be safely undertaken, to sophisticated packing methods utilizing foamed packing containers and the like. It has come to be realized that the packing material must have several attributes. The packing material should be impervious to water, resistant to rot, mildew, insects, and other destructive forces. In addition, it should be bulky enough to fill the carton and protect the article, but not so bulky as to require a package which would be extremely light in relation to its size. The single most important attribute of the packing material, however, is that it be able to withstand impact forces which would break or damage the packaged article. Furthermore, after withstanding the impact forces, it must have the ability to substantially recover its original shape, enabling it to withstand further impacts.

Synthetic thermoplastic materials have a number of attributes which make them ideally suited for many packaging applications. Among these attributes are their resistance to rot, insect damage, mildew, their imperviousness to moisture, and the ease with which articles may be wrapped therein. A sheet of thermoplastic material standing alone, however, does not have sufficient impact resistance to adequately protect the article being packaged. For this reason, sheets of thermoplastic material are generally fabricated into shapes which will give the desired impact resistance. For example, a sheet of thermoplastic material is formed into dimples and a second sheet laminated thereto to trap the air present in the dimples and form bubbles. The air bubbles within the slightly expandable sheet of material are relied on to give the desired impact resistance. This type of wrap is expensive to fabricate, however, since a coating usually must be applied to the two sheets of material to insure a satisfactory air barrier. Further, while this sheet is resistant to damage from moisture, mildew, insects, and the like, its impact resistance depends on the bubbles of air. If the air pockets become punctured, the impact resistance of the sheet is completely destroyed.

Other ways of using thermoplastic sheet include fabricating thick sheets (about 30 mils) into desired shapes and embossing a pattern thereon to cushion the article against shocks during handling. The use of relatively thick sheets, however, raises the price of the packaging material and thus limits its usefulness to packaging very expensive items where the cost of packaging is a rather small increment of the total cost.

In accordance with this invention, the above difficulties have been overcome by utilizing a thin sheet of plastic material having a plurality of closely spaced, adjacent cells formed therein. These cells are defined by substantially vertical walls and are formed in geometrical shapes resulting in a low bulk density packaging material. The vertical walls make up two substantially parallel sides of small, interconnected, hollow beams having as their side a planar portion of the packaging material. It is well known that even fairly flexible materials when formed into the shape of a hollow beam have increased resistance to bending, crushing and similar deforming forces and yet remain rather light. Further, when such material is formed into small beams, it will also more readily regain its original shape. An additional factor which gives strength to a sheet formed in this manner is that the cells have a geometric shape such that the beams are all interconnected and, thus, form a grid which acts in concert to give each beam additional strength and crush resistance. Furthermore, according to this invention, reinforcing material is applied to the open side of the cells to bridge and connect the beams so as to add rigidity to the cushioning material. In this manner, considerable strength is added to the cushioning material and its ability to absorb impact and regain its shape is increased. The reinforcing material may be in the form of fibers, either staple or continuous, or fibrillated film, ribbon filaments or fractured or apertured film. In a construction of this type, air freely passes to and from the cells upon impact as contrasted with hermetically-sealed air pocket type cushioning material.

The cellular cushioning material according to this invention may be produced in a manner described in detail in copending U.S. application Ser. No. 880,587, filed Nov. 28, 1969, now abandoned. Briefly, this method comprises extruding a molten curtain of thermoplastic material, preferably low density polyethylene into a continuous honeycomb-type mold while drawing a vacuum under the mold such that the molten material assumes the shape of the mold and then solidifies. The cushioning material is then stripped from the mold. The reinforcing material according to this invention may be applied to the cushioning material before it completely solidifies. Pressure may be applied if necessary to embed the reinforcing material slightly into the land areas of the cushioning material.

Accordingly, it is an object of this invention to fabricate a flexible thermoplastic sheet into a crush-resistant protective wrapper.

Another object of this invention is to form a crush resistant, protective wrapper out of a reinforced, flexible, thermoplastic sheet of material.

A still further object of this invention is to produce a crush resistant packaging wrapper of synthetic, thermoplastic flexible material in an economical and simple manner.

Yet a further object of this invention is to provide a method for fabricating a synthetic thermoplastic wrapping material.

Yet another object of this invention is to provide a method for manufacturing a flexible, crush resistant, protective wrapping in which a thermoplastic material is spread across a honeycomb mold, drawn into the mold to conform to the shape thereof, and then removed from the mold.

A further object of this invention is to provide a reinforced cushioning material having the ability to withstand repeated impacts without failure or collapse of the material.

These and other objects and advantages of this invention will be more apparent upon reference to the following specification, appended claims and drawings wherein:

In order to better understand the construction and use of this novel thermoplastic film, it will be described in relation to its utilization as a cushioning material for wrapping articles to be shipped. It is to be understood, however, that various other uses may be found for this novel material. For example, such a material can be utilized as a vibration absorbing pad to be placed under relatively light weight articles such as telephones, dictating machines, and the like. Other uses will be readily apparent to those skilled in the art.

Figure 1:
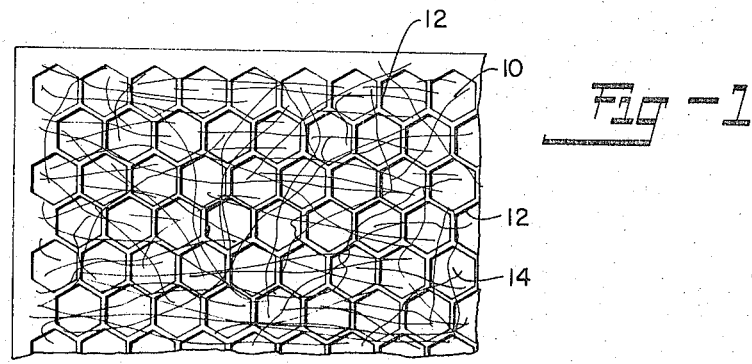
FIG. 1 is an enlarged plan view of a portion of a cushioning material according to this invention.
Figure 2:
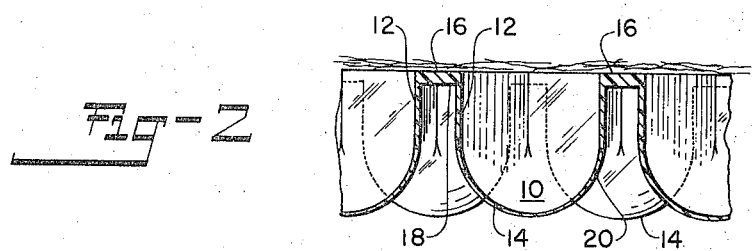
FIG. 2 is a cross-sectional view of the cushioning material taken along line 2–2 of FIG. 1.

With continued reference to the accompanying figures wherein like numerals designate similar parts throughout the various views and with initial attention directed to FIG. 1, reference numeral 10 designates a depressed, open-ended cell bounded by vertical walls 12 along its sides and a thin bubble-like membrane 14 across its bottom. As is best seen in FIG. 2, the vertical walls in adjacent cells 10 are connected by a planar shaped portion 16 which, in combination with the adjacent walls 12, forms an inverted U-shaped, hollow beam 18 (see FIG. 2). To add strength and rigidity to the structure, staple fibers are randomly placed on the land areas and are preferably heat-sealed to the land areas. The fibers may be placed thereon before the cellular structure, formed of a thermoplastic material, has completely solidified. It is preferred that the staple fibers be of a length at least twice the greatest width of the cells.

As is readily seen in FIG. 2, the vertical walls 12 extend into the cells 10 for a distance and then gradually curve, as at 20, to merge into the thin, bubble-like membrane 14 at the bottom of the cell 10. While the membrane 14 does not contribute to any substantial extent to the strength of the protective wrapping, it does form a moisture, insect and mildew proof barrier around the article being packaged.

Figure 3:
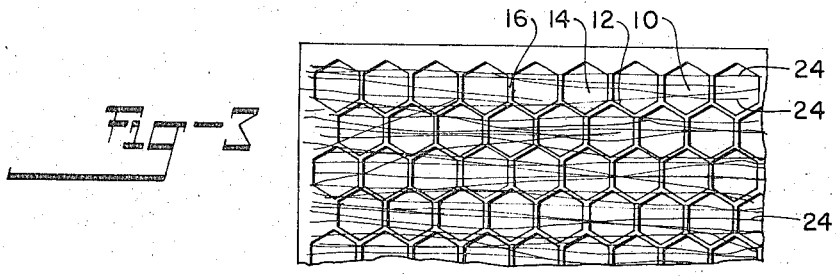
FIG. 3 is a view similar to FIG. 1 but showing a cushioning material having a different reinforcing material.
Figure 4:
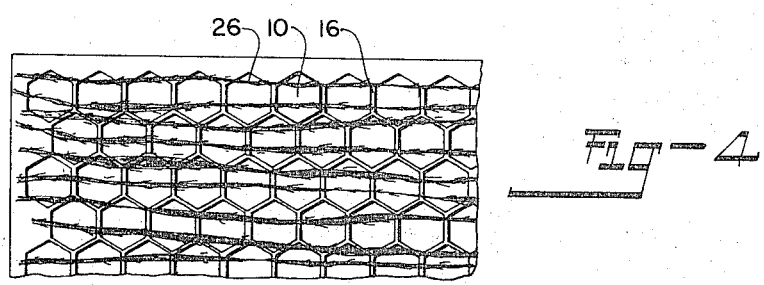
FIG. 4 is also a view similar to FIG. 1 but showing still another embodiment of this invention.

In the embodiments of the invention illustrated in FIGS. 3 and 4, different reinforcing materials or the cushioning material are illustrated. In FIG. 3, the reinforcing material is illustrated as being a plurality of continuous fibers 24. In FIG. 4, the reinforcing material is illustrated as being a fibrillated film 26. As in the embodiment of the invention illustrated in FIGS. 1 and 2, the walls of adjacent cells are joined by planar portions, forming with the side walls small U-shaped beams as discussed above in connection with FIG. 2.

While not wishing to be bound by any particular theory as to why superior protective qualities are obtained from the wrapping illustrated in FIGS. 1–4, it is believed that the small, interconnected beams formed by vertical walls 12 and planar portions 16 of the embodiment of FIGS. 1 and 2, for example, resist deformation and also exhibit, for any given material, a greater ability to regain their shape after being deformed. The grid or network of interconnected beams results in a structure which distributes any applied load over a substantial portion of the network. Furthermore, the reinforcing material has the distinct advantage of adding rigidity to the cushioning material as well as aiding in the recovery to its original shape after impact. Because the beams are formed of a flexible and deformable material, however, the combined strength of the network of beams will not be so great as to completely resist all deformation. The ability to deform under an impact load is important in absorbing the shock produced thereby and transmitting it to the article being protected or cushioned. The ability to substantially regain the pre-deformation shape is important in resisting any subsequent impacts. The hexagonally shaped cell 10 illustrated in FIG. 1 is the preferred geometric shape since, as is well known, it will resist deformation more readily in all directions than other shapes and does not require that the film be drawn into sharp corners as would be the case in squares, rectangles or triangles such as illustrated in FIG. 4.

Most thermoplastic materials suitable for forming films can be utilized in producing this protective, shock absorbent material. These include certain cellulose derivatives, polymethacrylates, polyamides, polyesters (including polycarbonates), polyethers, polyolefins, polystyrenes, polyurethanes and polyvinyls. A preferred material is low-density polyethylene.

Typical examples of useful cellulose derivatives include cellulose acetate, cellulose acetate butyrate and cellulose acetate propionate. Typical examples of useful polymethacrylates include polymers of methyl methacrylate and copolymers of methyl methacrylate with ethyl acrylate. Typical examples of useful polyesters include polyethylene terephthalate and poly(1,4-cyclohexylenedimethylene terephthalate). A typical useful polycarbonate is that prepared from phosgene and 4,4' - isopropylidenediphenol; another is the polycarbonate prepared from phosgene and 4,4' - (2-norbornylidene)diphenol. Typical examples of useful polyethers include epoxy resins, and polyoxymethylene. Typical examples of useful polyolefins include polyethylene, polypropylene, polyisobutylene, polybutene-1, polyallomers and conventional copolymers. Typical examples of useful polyvinyls include polyvinyl acetals, polyvinyl acetate, polyvinyl alcohol, polyvinyl carbozole, polyvinyl chloride, polyvinylidene chloride and polyvinyl ethers. Blends of these thermoplastic polymeric materials, copolymers, blends of copolymers, and blends of polymers and copolymers are also useful.

The reinforcing materials have a length at least twice the maximum width of the cells in the cushioning material. For example, natural or synthetic fibers or filaments may be used. The fibers are applied to the land areas of the cushioning material while it is in a slightly molten or tacky state, and may be pressed into the land areas by convenient means such as by a pressure roll. As the cushioning material solidifies, the fibers or filaments become embedded in the land areas to give the desired structure. Continuous synthetic filaments, such as filter tow, or fibrillated film may also be applied as described above. Thus, the filaments will bridge across at least two beams or land areas to provide rigidity and increased ability to regain shape.

The following examples are included for a better understanding of the invention.

EXAMPLE 1

Low-density polyethylene (density 0.917; melt index 20) is extruded into the melt tank of a curtain coater. The melt (maintained at 375° F.) is passed through a curtain coating head (32 inches wide) at the rate of about 175 lb./hr. The molten polymer curtain is allowed to fall onto a moving 16 foot continuous silicone rubber belt mold (honeycomb construction with following cell dimensions: 9 mm. distance from wall to wall, wall thickness of 0.8 mm., and depth of 9 mm.). The mold is 22 inches wide and is moving at a rate of about 55 ft./min. Vacuum is applied through holes in the bottom of the mold to draw the molten polymer into the mold. Immediately after vacuum is applied and while the polyethylene is still soft and tacky, cellulose acetate filter tow is applied to provide parallel strips of filter tow which are about 0.5 inches apart. The laminate is passed between nip rolls to provide a good heat seal and then wound under tension onto a tube so that the product is compressed by at least 50%. When the cushioning material is removed from the roll, it springs back to its original thickness.

The polyethylene portion of the cushioning material has a thickness of about 6 mm., walls with a thickness of about 1 mm. and a wall to wall dimension of about 9 mm.

Operating under the conditions of this example, about 44.7 square feet of cushioning material is obtained per pound of polyethylene. The thickness and the square footage of cushioning material per pound of polyethylene can be varied by varying the speed of the silicone rubber belt.

The cellulose acetate filter tow fibers are an integral part of the cushioning product but they do not completely close any of the cells of the polyethylene part of the structure. Thus, air is free to flow in and out of the cell structure when the product is compressed and then released. The presence of the cellulose acetate fibers provides dimensionally stability and provides improved cushioning power to the polyethylene cushioning material.

Cameras wrapped in the laminated cushioning material of this example are shipped via parcel post without damage. Other objects which are successfully wrapped in this cushioning material for shipment include glassware, watches, telescopes and phonograph records.

EXAMPLE 2

Cushioning material is made from low-density polyethylene (density 0.917; melt index 20) using the same equipment described in Example 1 except that a 3.5 inch extruder (20:1) is used to feed the polymer to the mold instead of a curtain coater. The melt temperature of the polyethylene is 400° F. and the polymer melt is forced through a 30 inch wide slit die having a 0.03 inch die opening and a 1.0 inch land onto the moving silicone rubber mold. Cellulose acetate staple fibers are applied to the honeycomb structure while the polyethylene is still tacky and the laminate is passed between nip rolls to provide a good heat seal between the mat of cellulose acetate fibers and the polyethylene. Air is free to flow in and out of the cell structure when this laminated structure is compressed and then released. The properties and cushioning power of this polyethylene-cellulose acetate fiber laminate are similar to that made using a curtain coater.

EXAMPLE 3

A laminated cushioning product is made from low-density polyethylene (density 0.925; melt index 29) according to the procedure of Example 1 except that continuous filament cellulose acetate fibers (I.V. 1.58; denier 3) are used instead of the cellulose acetate filter tow. The cellulose acetate fibers are quite close together but they do not restrict the flow of air in and out of the cells of the polyethylene when the product is compressed and then released.

EXAMPLE 4

A laminated cushioning product is made from medium density polyethylene (density 0.935; melt index 1.7) according to the procedure of Example 1 except that the polymer melt is maintained at about 400° F. and polyethylene terephthalate staple fibre (I.V. 0.6; denier 1.5) are used instead of the cellulose acetate filter tow. This cushioning product has good dimensional stability and provides good protection for glassware during shipment.

EXAMPLE 5

A laminated cushioning product is made from high-density polyethylene (density 0.960; melt index 15) according to the procedure of Example 1 except that the polymer melt is maintained at 425° F. and poly(1,4-cyclohexylenedimethylene terephthalate) staple fibers (I.V. 0.68; denier 16) are used instead of the cellulose acetate filter tow.

EXAMPLE 6

A laminated cushioning product is made from polypropylene (density 0.912; melt flow 4.6) according to the procedure of Example 1 except that the polymer melt is maintained at 450° F. and continuous filament polyethylene terephthalate fibers (I.V. 0.61; denier 3) are used instead of cellulose acetate filter tow.

EXAMPLE 7

A laminated cushioning product is made from polypropylene (density 0.913; melt flow 18) according to the procedure of Example 1 except that the polymer melt is maintained at 450° F. and fibrillated polypropylene ribbon filaments (melt flow 5.2; denier 1100) are used instead of the cellulose acetate filter tow.

EXAMPLE 8

A laminated cushioning product is made from plasticized cellulose acetate butyrate EAB–500–5 (20% dioctyl adipate plasticizer; 5 second viscosity) and cellulose acetate filter tow according to the procedure of Example 1 except that the melt temperature is maintained at 350° F. This laminated cushioning product provides good protection during shipment of cameras, watches, jewelry and the like.

Similarly good results are achieved when cellulose acetate filter tow is laminated to vacuum drawn, plasticized cellulose acetate or plasticized cellulose acetate propionate.

EXAMPLE 9

A laminated cushioning product is made from a propylene/ethylene polyallomer containing 2% ethylene (melt flow 1.7) according to the procedure of Example 1 except that the melt temperature is maintained at 475° F. and polypropylene staple fibers (melt flow 25; denier 15) are used instead of the cellulose acetate filter tow.

EXAMPLE 10

A laminated cushioning product is made from low-density polyethylene (density 0.917; melt index 20) according to the procedure of Example 1 except that nylon 66 staple fibers (I.V. 1.1; denier 18) are used instead of the cellulose acetate filter tow.

EXAMPLE 11

A laminated cushioning product is made from low density polyethylene and cellulose acetate filter tow according to Example 1 except that the polyethylene (density 0.917; melt index 20) contained a blue pigment (0.6% zulu blue), 1% $Sb_2O_3$, and 6% tetrabromophthalic anhydried. This blue laminated product is an effective cushioning material and is a flame resistant, decorative wall covering. When used as a well covering, it provides good sound-deadening properties.

The invention has been described in considerable detail with particular reference to certain preferred embodiments thereof, but it will be understood that variations and modifications can be effected within the spirit and scope of the invention.

We claim:

1. A molded thermoplastic cushioning material comprising:

a multiplicity of adjacent, closely spaced hollow protrusions extending from one side of a sheet material to form individual cells, each cell having an open base formed in said sheet material;

an interconnected grid of substantially planar land areas extending between and interconnecting adjacent spaced cells so as to provide a planar land area completely surrounding and extending outwardly from the open base of each of said cells toward the adjacent cells; and structural reinforcing means for said material comprising a multiplicity of random oriented fibers of a length at least twice the greatest width of said cells, substantially all of said fibers being attached to and serving to interconnect said land areas, whereby resistance to deformation of said molded cushioning material is substantially increased and air is free to flow into and out of said cells through said reinforcing means.

2. The cushioning material of claim 1, wherein said reinforcing fibers form a pervious covering for said sheet material.

3. The cushioning material of claim 1, wherein said reinforcing means includes a multiplicity of substantially continuous fibers.

4. The cushioning material of claim 1, wherein said cells incorporate substantially vertical walls, the vertical walls of adjacent cells forming, with the interconnecting land area therebetween, small hollow structural beams.

5. The cushioning material of claim 1, wherein each of said cells is closed on one side of said sheet material, the base of each of said cells opening toward the other side of said sheet material.

6. A molded thermoplastic cushioning material comprising:
 a sheet of thermoplastic material;
 a multiplicity of adjacent, closely spaced cellular protrusions extending from one side of the sheet material, said cellular protrusions having open bases formed in said sheet;
 an interconnected grid of land areas formed by said sheet and interconnecting the perimeters of adjacent spaced cellular protrusions so as to provide a planar land area surrounding the open base of said cellular protrusions; and
 structural reinforcing means for said cushioning material comprising a multiplicity of randomly oriented elongated elements of a length at least twice the greatest width of said cellular protrusions forming a thin pervious covering for said sheet, substantially all of said elements being attached to and connecting land areas of said sheet, whereby resistance to deformation of said cushioning material is substantially increased and flow of air into and out of said cells is substantially unimpaired.

References Cited
UNITED STATES PATENTS

| | | | |
|---|---|---|---|
| 2,575,764 | 11/1951 | Morner | 161—127 |
| 2,821,244 | 1/1958 | Beck | 161—127 |
| 3,048,514 | 8/1962 | Bentele et al. | 156—289 |
| 3,196,315 | 7/1965 | Peterson | 161—131 |
| 3,231,454 | 1/1966 | Williams | 161—127 |
| 3,423,263 | 1/1969 | Pannone | 161—127 |
| 3,455,772 | 7/1969 | Mason et al. | 161—127 |

WILLIAM J. VAN BALEN, Primary Examiner

U.S. Cl. X.R.

156—289; 161—69, 122, 127, 146, 148